Jan. 9, 1951 W. H. BRATTAIN 2,537,256
LIGHT-SENSITIVE ELECTRIC DEVICE
Filed July 24, 1946
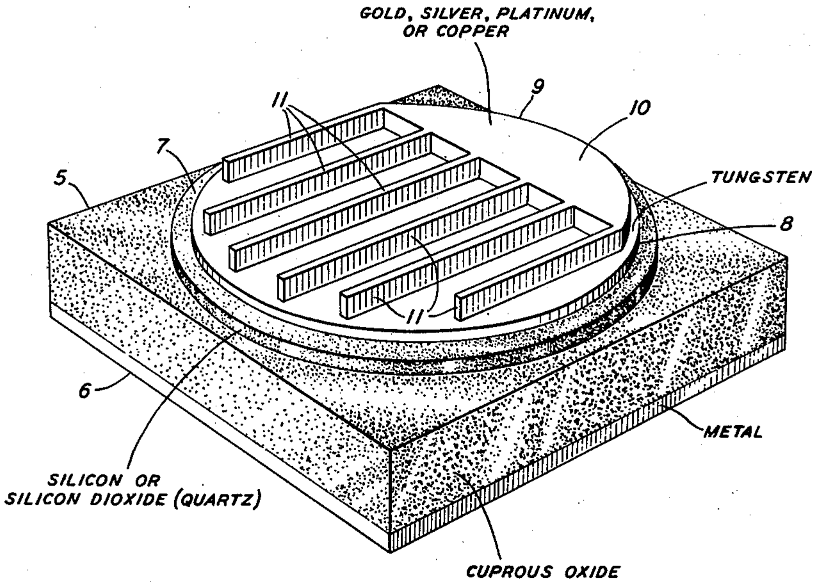
INVENTOR
W. H. BRATTAIN
BY
Stanley B. Kent
ATTORNEY Patented Jan. 9, 1951

2,537,256

UNITED STATES PATENT OFFICE 2,537,256

LIGHT-SENSITIVE ELECTRIC DEVICE

Walter H. Brattain, Chatham, N. J., assignor to Bell Telephone Laboratories, Incorporated, New York, N. Y., a corporation of New York Application July 24, 1946, Serial No. 685,933

15 Claims. (Cl. 136—89)

This invention relates to light-sensitive electric devices and more particularly to light-sensitive electric devices comprising silicon and methods of makng such devices.

An object of this invention is to provide improved light-sensitive electric devices comprising cuprous oxide and either silicon or silicon dioxide.

In an example of practice of this invention a photo-emf cell is formed by depositing in vacuo a thin film of silicon or silicon dioxide on a suitably supported body of cuprous oxide and providing electrical contacts to separated portions respectively of the film of silicon or silicon dioxide and the body of cuprous oxide. The body of cuprous oxide is formed preferably by completely oxidizing a sheet of copper so as to form a body of cuprous oxide therefrom and treating the surfaces of the oxidized body to produce clean surfaces of cuprous oxide. One face of the body of cuprous oxide is provided with a low resistance substantially non-rectifying electrode of metal, such as silver. The treated body is then placed in an evacuable chamber. After evacuation a thin layer of silicon or silicon dioxide is formed on the other face of the cuprous oxide by vaporization of silicon or silicon dioxide and deposition thereof on the cuprous oxide surface. A light-transmitting layer of tungsten is then formed on the film of silicon or silicon dioxide, also in vacuo, by vaporization of tungsten and deposition on the film of silicon or silicon dioxide. Finally an opaque metallic electrode is formed on the surface of the layer of tungsten in the form of a branched conductor which contacts only a portion of the tungsten surface, by vaporization and deposition in vacuo. Gold is used preferably for such opaque electrode but other metals may be used such as silver, platinum and copper. Terminal conductors for the device may consist of copper wires or ribbons soldered or otherwise held in contact with the non-rectifying electrode and the branched electrode respectively.

Such devices develop a voltage between the terminal conductors when visible or near infra-red light irradiates the film of silicon or silicon dioxide after passing through the light transmitting film of tungsten in the exposed portions between the branches of the opaque electrode. In use the surface of the cell carrying the branched electrode is illuminated with radiant energy which it is desired to convert into electrical energy.

The invention will now be described more in detail having reference to the accompanying drawing which consists of a single figure. The dimensions in the drawing are very much exaggerated particularly the thickness dimensions for clearness of illustration.

Referring now to the drawing a photo-emf cell according to this invention comprises a body 5 of cuprous oxide, the lower face of which is provided with a metal layer 6 to serve as one electrode. A thin layer or film 7 of material including silicon such as substantially pure silicon or silicon dioxide (quartz) is formed by vaporization and deposition in vacuo. On the exposed surface of the layer 7 a light transmitting film 8 of tungsten is formed also by vaporization and deposition in vacuo. On the exposed surface of film 8 a more substantial contactor 9 of gold is formed as by vaporization and deposition in vacuo. Contactor 9 is formed with a back portion 10 and many branches 11. The contactor 9 is opaque and makes contact with the film 8 at only a small percentage of the total surface of film 8. While only six branches 11 are shown in the drawing the number used would normally be very much larger in order to furnish satisfactory conductivity from all portions of the film 7. One terminal conductor may be attached to the back portion 10 of contactor 9 and a second terminal may be attached to the metal layer 6. These terminals may be connected by soldering or in any suitable manner. The above described photo-emf cell may be mounted in any suitable manner to prevent breakage of the cuprous oxide body 5.

The body 5 of cuprous oxide may be formed in any well-known manner. A satisfactory method comprises completely oxidizing a thin sheet of copper to form cuprous oxide. The low resistance substantially non-rectifying layer 6 is formed preferably by the method of Patent No. 2,239,770 of J. A. Becker and W. H. Brattain issued on April 29, 1941, modified to the extent necessitated by the fact that the body 5 of cuprous oxide is not formed on a copper plate as in the patent. An advantage of using a low resistance non-rectifying metal layer 6 as one electrode is that the body 5 of cuprous oxide may be made relatively thin without danger of setting up a back-wall electromotive force which would oppose the desired electromotive force when the front-wall of the photo-emf cell is illuminated in use. Furthermore the low resistance of this contact is in itself advantageous.

Bodies of cuprous oxide having metallic electrodes connected to a part of the surfaces thereof which are formed by other methods than hereinbefore specifically described, may be used in practicing this invention.

Typical thickness dimensions will now be given merely to assist in practicing the invention. Other thicknesses may be found useful in certain instances. The body 5 may be of any desired thickness so long as it is strong enough to be handled. A thickness of 10 mils is satisfactory for the body 5 of cuprous oxide. The metal electrode 6 may be formed of silver 0.1 mil thick or of other metals, such as gold, aluminum, zinc, cadmium, platinum or copper. Good results have been obtained with a thickness of silicon film 7 of the order of 0.004 mil and of silicon dioxide film 7 of the order of 0.0002 mil. Light-transmitting tungsten films of from three to eight ten-thousandths of a mil give optimum sensitivity, a thickness of 0.0004 mil giving good results. For contactor 9 a gold deposit 0.04 mil thick is satisfactory.

Methods of treating cuprous oxide to produce clean surfaces of cuprous oxide are well known. A suitable cleaning method is disclosed in E. D. Wilson Patent No. 2,154,295 April 11, 1939. The completely oxidized sheet of copper is etched in a nitric acid bath to produce clean surfaces of cuprous oxide after which the body of cuprous oxide is rinsed in distilled water to remove the acid and dried. Other well-known cleaning methods may be used. Vacuum deposition methods for producing layers of silicon, silicon dioxide, tungsten, gold and other metals are also well known and need not be described herein for a clear understanding of this invention.

The light-transmitting layer 8 may comprise a film of a noble metal such as platinum or gold but tungsten is preferred for this layer. The light-transmitting layer 8 may also comprise cadmium oxide.

The specific examples of practice mentioned hereinbefore have been described merely by way of illustration and are not to be construed in a limiting sense. The scope of the invention is defined by the appended claims.

What is claimed is:

1. A light-sensitive electric device comprising a body of cuprous oxide, a thin film of silicon on a part of the surface of said body of cuprous oxide, a light-transmitting film of tungsten on said film of silicon, and electrical conductors contacting respectively said body of cuprous oxide and said film of tungsten on remote portions of the surfaces thereof.

2. A light-sensitive electric device comprising a body of cuprous oxide, a film of silicon of the order of 0.004 mil thick on a part of the surface of said body of cuprous oxide, a light-transmitting layer of metal on said film of silicon, and electrical conductors contacting respectively said body of cuprous oxide and said light transmitting layer of metal on remote portions of the surfaces thereof.

3. A light-sensitive electric device comprising a support, a body of cuprous oxide, a film of silicon of the order of 0.004 mil thick on a part of the surface of said body of cuprous oxide, a light-transmitting layer of metal on said film of silicon, an opaque metallic contactor connected to a portion only of the surface of said light transmitting layer, and an electrical conductor contacting said body of cuprous oxide on a portion of the surface of said body remote from said film of silicon.

4. A light-sensitive electric device comprising a body of cuprous oxide formed by completely oxidizing a thin sheet of copper and then cleaning the resulting body of cuprous oxide, a thin film of silicon on one face of said body of cuprous oxide, a light-transmitting film of tungsten between three and eight ten-thousandths of a mil thick overlying a portion of said film of silicon, an opaque metallic contactor connected to a portion only of the surface of said light transmitting film of tungsten, and a metallic electrode attached to the other face of said body of cuprous oxide.

5. A light-sensitive electric device comprising a body of cuprous oxide in the form of a thin sheet, a film of silicon of the order of 0.004 mil thick on one face of said body of cuprous oxide, a light-transmitting film of tungsten of the order of 0.0004 mil thick overlying a portion of said film of silicon, an opaque metallic contactor connected to a portion only of the surface of said light transmitting film of tungsten, and a metallic electrode attached to the other face of said body of cuprous oxide.

6. A light-sensitive electric device comprising a body of cuprous oxide in the form of a sheet of the oder of 10 mils in thickness, a film of silicon of the order of 0.004 mil thick formed by vaporization and deposition in vacuo on one face of said body of cuprous oxide, a light-transmitting film of tungsten between three and eight ten-thousandths of a mil thick overlying a portion of said film of silicon, an opaque branched contactor of gold of the order of 0.04 mil thick connected to a portion only of the surface of said light transmitting film of tungsten, and a low resistance substantially non-rectifying electrode of silver deposited on the other face of said body of cuprous oxide.

7. A light-sensitive electric device comprising a body of cuprous oxide, a thin film of silicon dioxide on a part of the surface of said body of cuprous oxide, a light-transmitting film of tungsten on said film of silicon dioxide, and electrical conductors contacting respectively said body of cuprous oxide and said film of tungsten on remote portions of the surfaces thereof.

8. A light-sensitive electric device comprising a body of cuprous oxide, a film of silicon dioxide of the order of 0.0002 mil thick on a part of the surface of said body of cuprous oxide, a light-transmitting layer of metal on said film of silicon dioxide, and electrical conductors contacting respectively said body of cuprous oxide and said light-transmitting layer of metal on remote portions of the surfaces thereof.

9. A light-sensitive electric device comprising a body of cuprous oxide, a film of silicon dioxide of the order of 0.0002 mil thick on a part of the surface of said body of cuprous oxide, a light-transmitting layer of metal on said film of silicon dioxide, an opaque metallic contactor connected to a portion only of the surface of said light-transmitting layer, and an electrical conductor contacting said body of cuprous oxide on a portion of the suface of said body remote from said film of silicon dioxide.

10. A light-sensitive electric device comprising a body of cuprous oxide formed by completely oxidizing a thin sheet of copper and then cleaning the resulting body of cuprous oxide, a thin film of silicon dioxide on one face of said body of cuprous oxide, a light-transmitting film of tungsten between three and eight ten-thousandths of a mil thick overlying a portion of said film of silicon dioxide, an opaque metallic contactor connected to a portion only of the surface of said light-transmitting film of tungsten, and a metallic electrode attached to the other face of said body of cuprous oxide.

11. A light-sensitive electric device comprising a body of cupous oxide in the form of a thin sheet, a film of silicon dioxide of the order of 0.0002 mil thick on one face of said body of cuprous oxide, a light-transmitting film of tungsten of the order of 0.0004 mil thick overlying a portion of said film of silicon dioxide, an opaque metallic contactor connected to a portion only of the surface of said light-transmitting film of tungsten, and a metallic electode attached to the other face of said body of cuprous oxide.

12. A light-sensitive electric device comprising a body of cuprous oxide in the form of a sheet of the order of 10 mils in thickness, a film of silicon dioxide of the order of 0.0002 mil formed by vaporization and deposition in vacuo on one face of said body of cuprous oxide, a light-transmitting film of tungsten between three and eight ten-thousandths of a mil thick overlying a portion of said film of silicon dioxide, an opaque branched contactor of gold of the order of 0.04 mil thick connected to a portion only of the surface of said light-transmitting film of tungsten, and a low resistance substantially non-rectifying electrode formed on the other face of said body of cuprous oxide.

13. A light-sensitive electric device comprising a body of cuprous oxide, a thin layer of material consisting of one of the materials from the group of materials consisting of silicon and silicon dioxide on a part of the surface of said body of cuprous oxide, a light-transmitting layer of cadmium oxide on said thin layer of material, and electrical conductors contacting respectively said body of cuprous oxide and said layer of cadmium oxide.

14. The method of fabricating a photo-E. M. F. cell which comprises forming, in vacuo by vaporization and deposition, a layer of material consisting of one of the materials from the group of materials consisting of silicon and silicon dioxide on a portion of the surface of a body of cuprous oxide, said layer having a thickness of the order of 0.004 mil for silicon and 0.0002 mil for silicon dioxide, and subsequently an electrically conducting layer on said first-mentioned layer of material different from the material of said first-mentioned layer which conducting layer transmits light in the form of electro-magnetic energy.

15. A light sensitive electric device comprising a body of cuprous oxide in the form of a sheet of the order of 10 mils in thickness, a low resistance substantially non-rectifying metallic electrode deposited on one face of said body of cuprous oxide, a film of silicon of the order of 0.004 mil thick on the other face of said body of cuprous oxide, and a light-transmitting layer of metal on said film of silicon.

WALTER H. BRATTAIN.

REFERENCES CITED

The following references are of record in the file of this patent:

UNITED STATES PATENTS

| Number | Name | Date |
|---|---|---|
| 2,015,431 | McIlvaine | Sept. 24, 1935 |
| 2,172,232 | Wilson | Sept. 5, 1939 |
| 2,189,580 | Hewlett | Feb. 6, 1940 |
| 2,293,248 | Fink | Aug. 18, 1942 |